Feb. 20, 1962  F. CASIGLIA  3,022,130
CONTINUOUS RECORDING OF GRAPHS AND INSTRUMENTS THEREFOR
Filed Dec. 13, 1957  5 Sheets-Sheet 1

INVENTOR
*Francesco Casiglia* by *Wenderoth, Lind & Ponack*
ATTORNEYS

Feb. 20, 1962 F. CASIGLIA 3,022,130
CONTINUOUS RECORDING OF GRAPHS AND INSTRUMENTS THEREFOR
Filed Dec. 13, 1957 5 Sheets-Sheet 2
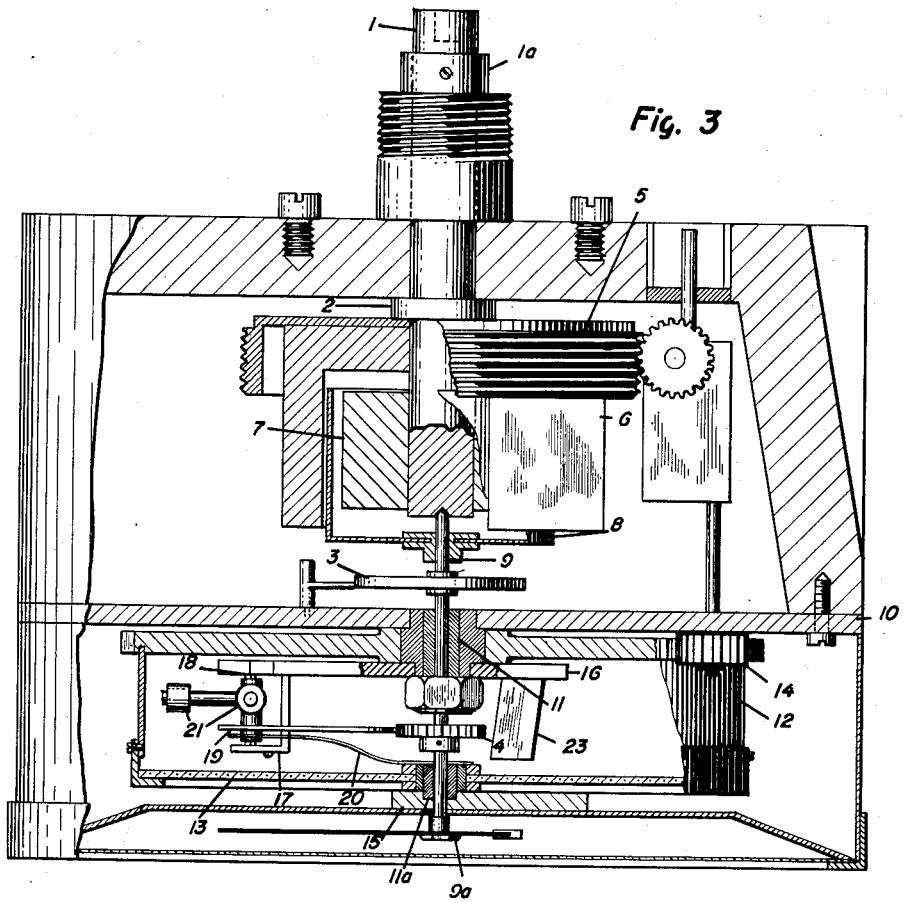
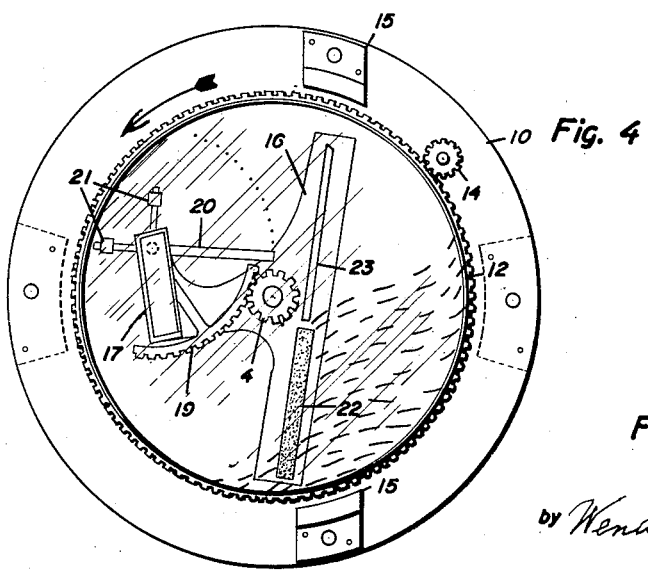
INVENTOR
Francesco Casiglia
ATTORNEYS Feb. 20, 1962  F. CASIGLIA  3,022,130
CONTINUOUS RECORDING OF GRAPHS AND INSTRUMENTS THEREFOR
Filed Dec. 13, 1957  5 Sheets-Sheet 3
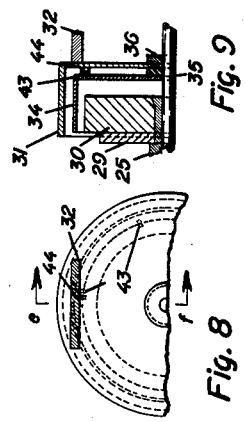
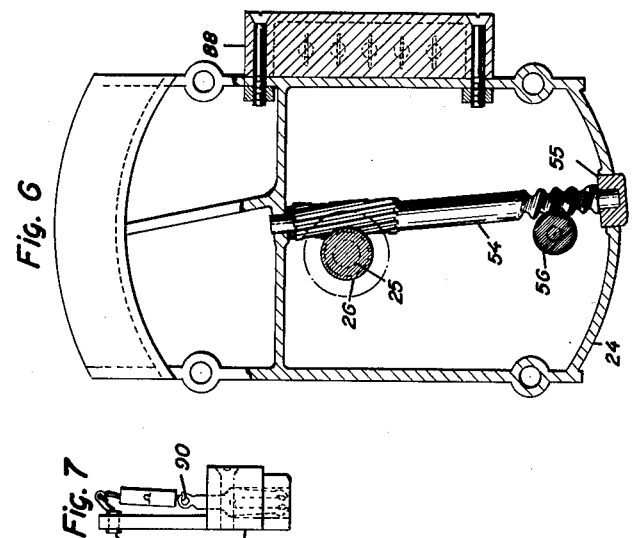
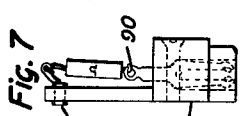
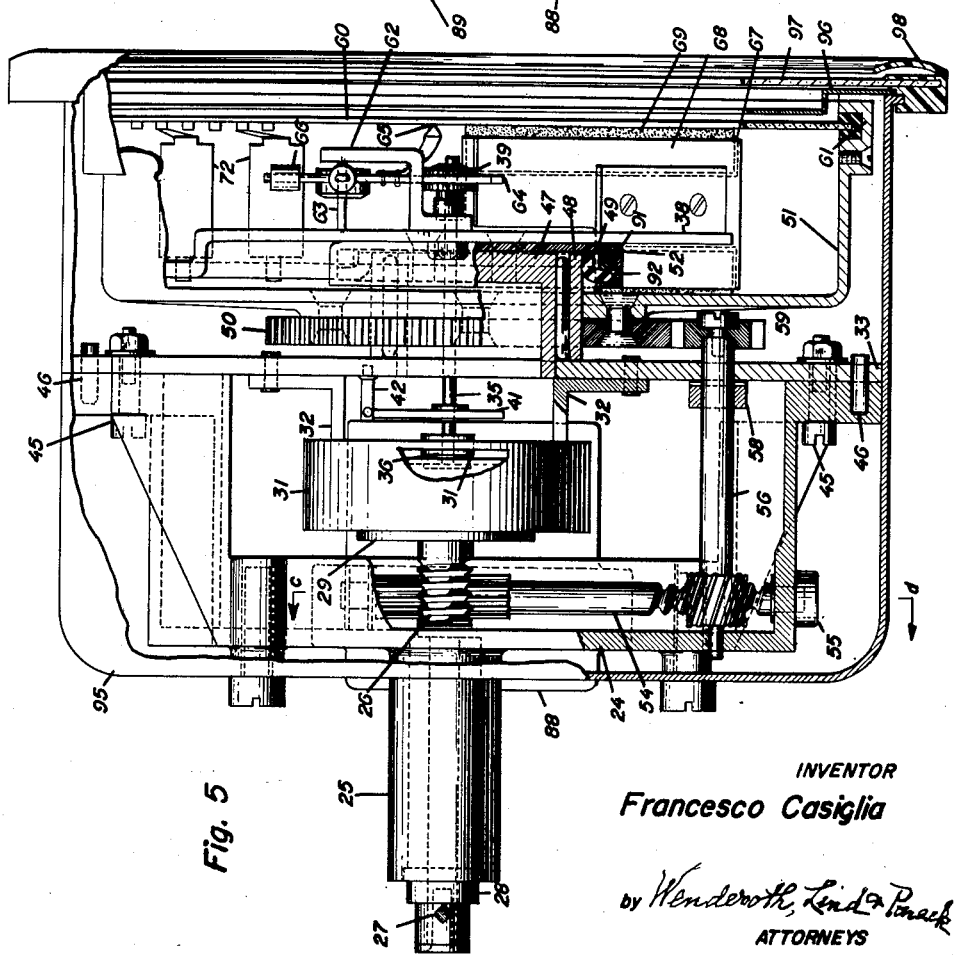
INVENTOR
Francesco Casiglia
by Wenderoth, Lind & Ponack
ATTORNEYS Feb. 20, 1962 F. CASIGLIA 3,022,130
CONTINUOUS RECORDING OF GRAPHS AND INSTRUMENTS THEREFOR
Filed Dec. 13, 1957 5 Sheets-Sheet 4
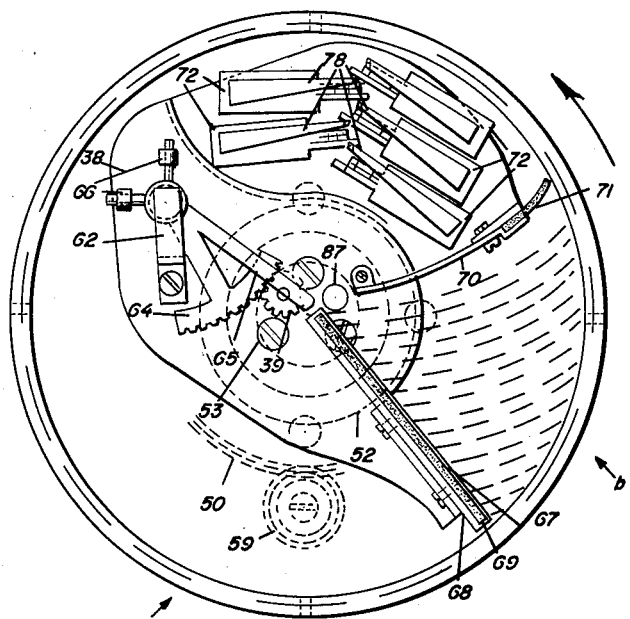
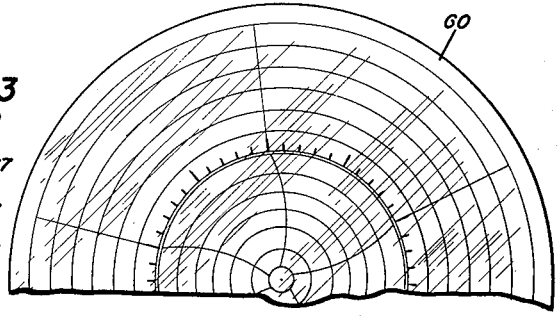
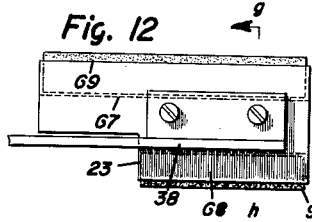
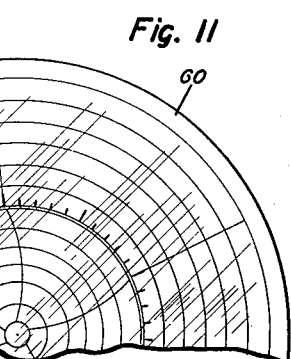
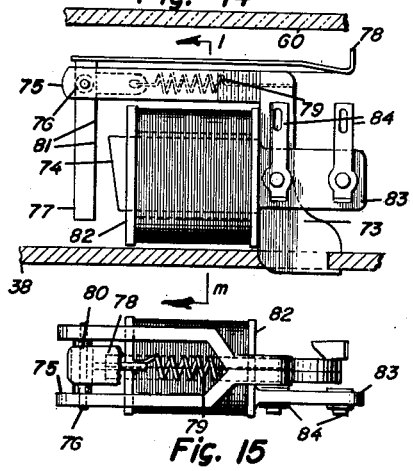
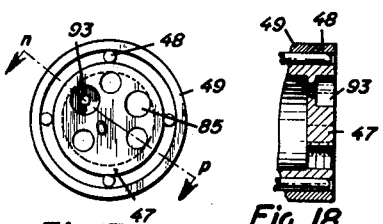
INVENTOR
Francesco Casiglia
by Wenderoth, Lind & Ponack
ATTORNEYS

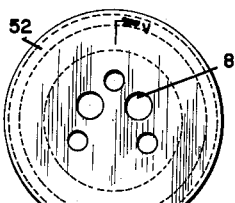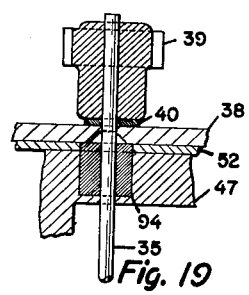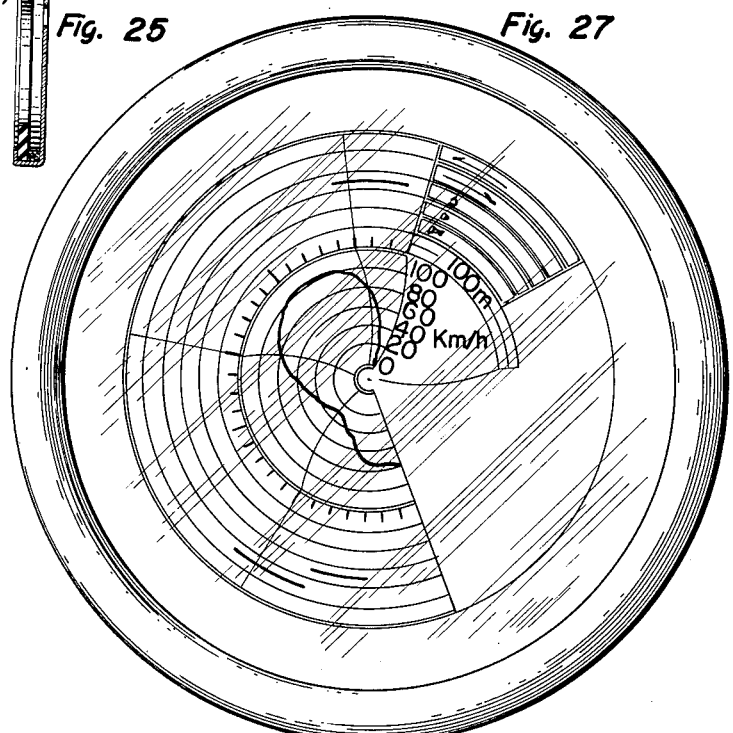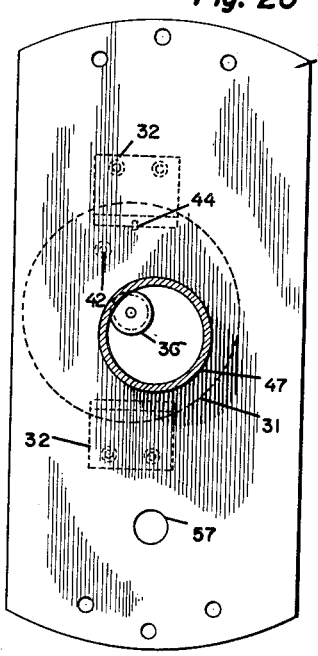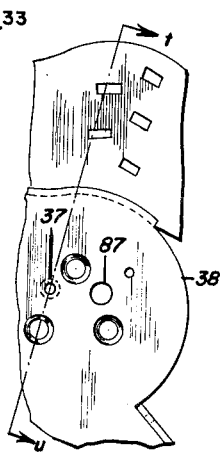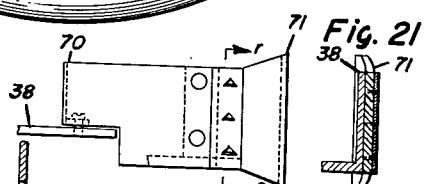

United States Patent Office 3,022,130
Patented Feb. 20, 1962

3,022,130
CONTINUOUS RECORDING OF GRAPHS AND INSTRUMENTS THEREFOR
Francesco Casiglia, 30 Via Siracusa, Palermo, Italy
Filed Dec. 13, 1957, Ser. No. 702,716
8 Claims. (Cl. 346—21)

The invention relates to a system for recording graphs wherein the recorder does not require any servicing for the replacement of the part on which the recording is done.

In conventional recorders the recording of graphs is done on a piece of paper or card, which, at a certain moment has to be replaced. In the present system the recording is done on a layer of powder which adheres to the transparent wall of a revolving container such as a cylinder, drum, sphere and the like which is continually reconditioned while the recording is proceeding.

An object of the invention is to provide an absolutely simple system wherein cheap recorders may be manufactured which can be operated by unskilled personnel and can be utilized for the recording of graphs of any parameter as well as for the control of plants in general such as automobiles.

The invention also concerns a type of recorder and such an instrument is described with reference to the control of an automobile. This, however, must not be understood as a limit to its uses as the recorder described hereunder can be used for the control of items other than speed as well as for the control of other plants.

With the above and other objects in view which will become apparent from the detailed description below some preferred forms of the invention are shown in the drawings in which:

FIG. 3 is a partial cross sectional view with portions shown in plan of the apparatus shown in FIG. 2.

FIG. 4 is a front view of the apparatus shown in FIG. 2 with the dial and needle removed showing the interior of the revolving drum.

FIG. 5 is a right hand side view of a modification with portions in cross section taken upon a diametrical plan.

FIG. 6 is a view taken along section line c—d of FIG. 5 with the upper portion in elevation and the lower portion in cross section.

FIG. 7 is an elevational view of a plug having five contacts and with a base supporting the resistances.

FIG. 8 is a cross sectional view taken upon section line e—f of FIG. 9 illustrating the electro-magnet complex.

FIG. 9 is a plan view of the construction shown in FIG. 8.

FIG. 10 is a front view of the revolving drum with portions in cross section.

FIG. 11 is a partial view of the glass disc which covers the drum.

FIG. 12 is a top view of the powder supporting sheet and the powder removing element.

FIG. 13 is a cross sectional view of the construction shown in FIG. 12.

FIG. 14 is an enlarged side view of the electro-magnet for operating a stylus.

FIG. 15 is a plan view of the construction shown in FIG. 14.

FIG. 16 is a cross sectional view taken upon section line l—m of FIG. 14.

FIG. 17 is a front view of the bearing.

FIG. 18 is a cross sectional view taken upon section line n—o—p of FIG. 17.

FIG. 19 is a cross sectional view with parts in elevation of the spindle of the speedometer illustrating the powder seal.

FIG. 20 is a plan view taken in the direction of the arrow b of FIG. 10.

FIG. 21 is a cross sectional view taken upon section line r—s of FIG. 20 showing the covering sheet.

FIG. 22 is a partial front view of a supporting plate.

FIG. 23 is a cross sectional view taken upon section line t—u of FIG. 22

FIG. 24 is a front view of a disc with a rubber ring for the storage of powder.

FIG. 25 is a cross sectional view taken upon section line v—z of FIG. 24.

FIG. 26 is a front view of the plate with the axle of the bearing in cross section; and FIG. 27 is a front view of the recorder.

Figure 1:
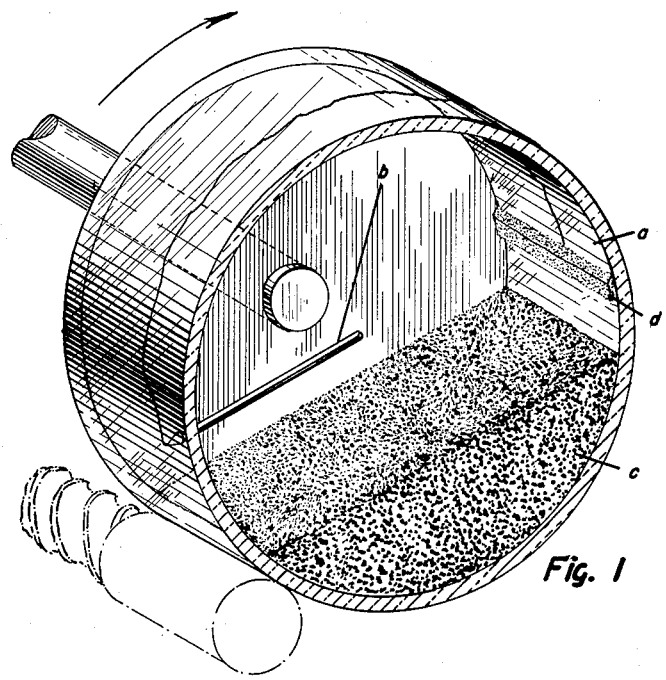
FIG. 1 is a perspective view of a recording system in accordance with the invention.

Referring to FIG. 1, $a$ indicates the revolving cylindrical recording surface and $b$ represents the stylus contacting laterally the inside surface of cylinder $a$. The inside surface of the cylinder is lined with a thin layer of powder provided from the deposit $c$ located at the bottom of the cylinder. A wiper $d$ preferably of a sponge plastic is applied at a fixed position against the revolving surface and presses lightly against the same so as to remove from such surface the layer of adhering powder. When the cylinder rotates in the direction of the arrow in FIG. 1, the interior surface thereof will be covered with a layer of powder and the cylinder, as seen from the outside, will assume the coloring of such powder. The stylus $b$ coacting with such layer will make a furrow therein to indicate its position. The graph so made may be observed until upon the continued rotation of the cylinder the wiper $d$ wipes the layer of powder $c$. Such layer, however, is replaced immediately when the cylinder surface passes through the deposit $c$.

In this way the stylus will always coact with a fresh and unattached layer of powder and when the cylinder stops its rotation, such graph will remain observable indefinitely.

The powder adheres to the cylinder surface by normal adhesion and such adhesion is a function of the fineness of the powder as well as the smoothness of the surface.

The deposit of powder as shown depends upon gravity for its position but, of course, in various other applications different means may be provided to hold such deposit stationary in various places by different types of supporting means.

The powders upon the market such as talcum, metal, decorative powders, graphite and the like generally have the property of adhering more or less efficiently to surfaces with which they are brought into contact.

When a layer of powder may drop off partly from the surface, then a powder may be chosen which has a greater adhesive power or such a power may be obtained by incorporating a greasy substance into the powder. This may be achieved in two ways:

(1) Mixing a fatty acid such as stearic acid, oleic acid, or similar substances, finely powdered, or a powdered natural or artificial wax, and with characteristics similar to these acids, with the selected powder.

(2) Using those powders already in commerce and prepared for decorative use, processed for such purpose. The most usual process consists in pouring the powder to be made bright into a revolving drum furnished with brushes, and mixing it with greasy materials such as stearic acid in the most suitable proportions.

The powder as described above, renders the layer brighter and consequently the furrow more conspicuous.

In heated premises and in tropical countries it is necessary that the powder in the recorder, as mentioned above, be mixed with a greasy substance that has a high melting point in order to avoid inconveniences caused by the softening or melting of the greasy substance, e.g. stearic acid with melting point ranging from 55° C. to 114° C. is available in commerce.

The process can also take place without using the wiper *d* which removes the layer of powder, because the deposit of powder, getting into contact with the furrow made by the stylus can cover such furrow up with other powder, thereby deleting in this way the preceding recording.

Figure 2:
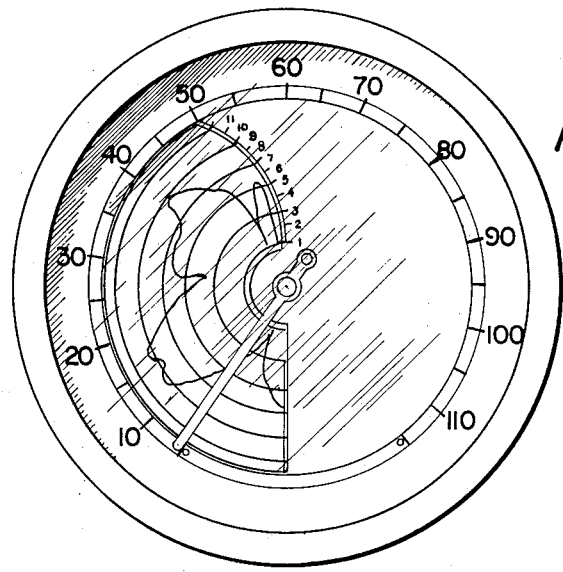
FIG. 2 is a front view of a speedometer for automobiles having incorporated therein the recording mechanism.

In FIGS. 2, 3 and 4, the invention is applied to a speedometer for automobiles.

The control spindle is indicated at 1 with a projection 2 and such spindle may revolve freely in the frame work and is held from axial movement by the collar 1a. Connected to the spindle and bearing against the projection is a brass cup 5 threaded externally as a perpetual screw. There is a permanent U-shaped magnet 6 with semi-circular extensions and an iron cylinder 7. In the gap existing between the polar extensions and the cylinder there is provided an aluminum cup. An iron disc 10, having at its center a brass bushing, is screwed to the framework. A drum 12, having on the outside a geared crown revolves around said bushing. The drum is hermetically closed with a disc of thin glass 13, kept in place by suitable packings, by a stiffening ring attached to the drum by screws. The glass disc has at its center a brass bushing 11a which protrudes towards the outside. This protruding part bears against a blind hole, placed in the iron bridge 15. The bridge 15, shown in section in FIG. 3, and showing only the supporting base in FIG. 4, is screwed to the iron disc 10. The part of the bushing which is in the drum has a smaller diameter and is threaded. On this part of the bushing is introduced the brass plate 16 which, by means of a screw-nut, is blocked in the bushing. Owing to this setting, the plate, which does not participate in the revolving of the drum keeps the drum protected from axial movements. The plate 16, in its upper left hand part in FIG. 3 supports, fixed with screws, a small brass bridge 17 similar to that used in watches to support the rocking arm.

Between two holes, drilled in correspondence, one in the arm of the small bridge, the other on the plate, a small spindle of iron 18 is free to revolve with a minimum of friction. To the spindle 18 there are fixed a brass arm 19 carrying a sector gear, a thin lamina of hardened iron 20, at the free end of which is fixed a fiber stylus in the form of a cone and which is curved in order to bear lightly at its point against the inner surface of the glass disc.

The plate 16 has also at its lower part a support to which is attached a strip of sponge plastic 22 which touches lightly against the inside surface of the glass. The same plate 16 carries a metallic wing 23 in oblique position relative to the plane of the glass. The tempered steel spindle 9 crosses the drum axially and is free to revolve, with a minimum of friction, between the blind hole of the spindle 1 and the through-hole drilled into the bridge 15. To this small spindle, besides the already described aluminum cup 8, are attached a coil spring fixed with its free end to an anchor, a small gear 4 which meshes with the sector gear 19 and a balanced index pointer 9a.

In the inside of the drum there is a deposit of fine powder, e.g. aluminum powder, held by the support for the plastic sponge 22. This powder is shown in FIG. 4 by dotted lines.

During the rotation of the drum the powder which adheres to the glass disc is removed by the wiper 22 and, falling downwardly, rises gradually again in the existing free space, as seen in FIG. 4, between the lower part of the base with the wiper 22 and the wall of the drum. The crown gear of the drum meshes with the pinion 14 which receives its motion through a speed reduction gearing from the spindle 1. In such gearing, if necessary, there is included a device for transmitting the movement in only one direction.

The instrument, however, besides indicating by means of the index pointer the actual value of the speed, will also by means of a polar diagram show the values of said speed along a determined length of route. This device works continuously and without ever needing exchanges or servicing, owing to the automatic regeneration of the layer of powder and non-consumption thereof. In order to avoid loss of powder, two washers of plastic sponge, not shown, are placed between the gear 4 and the bushings 11 and 11a. The wing 23 prevents the powder from falling accidentally in great quantities on the gear and sector gear when the recorder may be accidentally upset.

The speedometer has a window opening of circular shape through which can be seen the portion of the glass disc on which are drawn in concentric circumferences the lines of reference for the measurement of the speed. The graduation is indicated on the outside rim of the window opening.

Obviously, the instrument, eliminating the index pointer and the relative scale, can be used as tachometer.

FIGURES 5 to 27 show a mechanism which, besides the speed, also records the control, adjustment and similar parameters of any installation.

A frame 24, see FIGS. 5 and 6, has two semi-circular arms, supporting a usual electro-magnetic device similar to those of conventional speedometers. There is provided a control shaft 25 with a square hole 27, a collar 28, an Archimedean screw 26, a circular magnet 30 with a ferro-nickel magnetic shunt 29, see FIGS. 5, 8 and 9, an aluminum cup having two stops 43 fixed to the steel spindle 35, an iron drum 31 stopped by two abutments 32 and this drum has a stop 44 which cooperates with the stops 43.

The spindle 35 is rotatably mounted within the bushing 36 and the hole 37, see FIGS. 5, 8, 19, 22 and 23, has a coil spring 41 fixed at the free end, to a pin 42 and a pinion 35. Between this pinion and the plate 38 there is a washer 40.

With such a construction, to a particular value of the revolving speed of the shaft 25, a particular angular movement of the pinion 39 will correspond.

The arms of the framework fixed by four bolts 45 (FIGURE 5) and guided by the two reference pins 46 support the steel plate 33 (FIGURES 5 and 22) which has at its center a hole into which is fixed or soldered a steel cylinder 47 (FIGURES 5, 26, 17 and 18), partly hollowed to render it lighter, around which can revolve, bearing against an interposed ring with a set of steel rollers 48, a hollow steel cylinder 49. On the latter is fixed or soldered a gear 50 (FIGURES 5 and 1) to which is joined the base of a drum 51 of metal or thermo-plastic material, with thin walls, having ribs on the external part of the base.

The cylinder 49 is held against axial movement by the steel disc 52, which also has another function described below, maintained against the face of the axle of the bearing by a brass sheet fixed by three flathead screws 53 (FIGURE 10). The drum revolves in the direction indicated by the arrow in FIGURE 10 by said spindle since the screw 26 (FIGURES 5 and 6) meshes with a helicoidal gear on the spindle 54. The latter is held in place by a brass bushing 55, thrust into a hole of the framework and transmits motion to another spindle by means of a similar couple of a screw and helicoidal gear. The spindle 56 rotates in two bearings, one in the framework and the other, 57, in the plate 33 and has a collar 58 which prevents axial movement. The prolongation beyond plate 33 has a square cross section and is perforated axially with a threaded hole. Upon this prolongation is fitted a metallic pinion 59 having a corresponding square hole at the center which is held in place by a screw.

The gear ratio will be chosen according to the selected revolving speed of the drum.

The drum is hermetically closed by a disc 60 of glass or transparent plastic material (FIGURES 5 and 11), which is held in place with a suitable interposed washer, by a ring of metal or of thermo-plastic material 61 attached to the drum by screws. On the brass plate 38 there is fixed a brass bridge, which sustains a steel spindle 63 on which is keyed an arm which carries a brass sector gear 64, which meshes with the pinion 39. The arm supports also a flat spring 65 of non-magnetic material, curved in such a way that the extremity, bent upwardly bears with light pressure against the glass. The part of the flat spring bearing on the glass is sharpened to a point. The sector gear is astatic owing to the counter weights 66.

The plate 38 is bent at a right angle and has affixed thereto by the means of bolts, a wing of metal or thermo-plastic material 68 (FIGURES 5, 10, 12 and 13) to which is fastened a plate with three bent rims 67 to form a space into which can be introduced a strip of rubber or plastic spongy or soft material 69, of such height as to press lightly, all along its length against the glass disc. The wing 68 supports another strip of plastic sponge or rubber 99 which presses lightly against the base of the drum for helping to keep the powder deposit. In the same way, the plate holds another wing 70 (FIGURES 10, 20, and 21) which supports a ribbon of elastic rubber or similar material, so as to bear lightly only against the side wall of the drum. This last wing is attached by a screw, also to the central part of the plate 38.

This wing and the part of the plate which holds the wing are not shown in FIGURE 5.

The plate 38 is bent at the upper part in a curved line to form a lower plane in which are drilled five rectangular holes (FIGURES 10, 22 and 23) in which are soldered five electro-magnets with flat springs arranged as styluses.

In FIGURES 5 and 10 these electro-magnets are represented by rectangles, and in FIGURE 5, there are shown only two of such electro-magnets, while the other three are indicated only by the styluses.

The electro-magnet 72 (FIGS. 14, 15, and 16) is formed by two strips of metal, one against the other, the base of which 73 is introduced in the hole drilled in the plate 38. The coil 82, having a wing on which there are two sockets for fastening the terminals of the winding, is introduced on the core 74. The strips of metal are bent in order to form two arms 75. These arms support a shaft 76 carrying the armature 77. This armature has a pin 80 and a brass elastic lamina 78 bent at the end in order to form the tracing stylus. A spring 79 holds the armature in normal position.

As can be seen in FIGURE 10, each lamina 78 is fastened to its armature to form with the axis of each electro-magnet a certain angle, in order to obtain the same distance among the five styluses.

The wires connecting the coils come out of the drum through the holes 87, 86, and 85 drilled in the plate 38, in the disc 52 and in the cylinder 47.

When the electro-magnet is excited the end of the lamina 78 will bear on the glass disc 60. In order to avoid heating of the coils the current will be adjusted to a minimum by including adequate resistances in series. These resistance may be fastened to the terminals 89 and 90 in the base 88.

This base of insulating material constitutes a body with a socket of five holes and is fixed to the framework by two bolts (FIGURES 6 and 7), so as to project into the back of the recorder. The plug with base 88 is indicated in FIGURE 5 only in profile. In the interior of the drum, sustained by the wing 68 and in such quantity as to occupy about the space marked in FIGURE 10 with undulated dotted lines, is stationed the deposit of powder for the formation of the layer on which the recording is carried out.

Between various powders available it is advantageous to choose for its lightness, for its coloring and for its stability aluminum powder having therein a fatty substance.

The wing 70, besides holding the ribbon 71, has the task of preventing the powder from accidentally, during transport of the recorder mounting, precipitating on top of the electro-magnets. It should be noted also that, if the powder should leave the zone assigned to it, which could only happen during its transport and mounting, the powder would return to occupy its special zone within the first few turns of the drum.

For the storage of the powder, the steel disc 52 (FIGURES 5, 24 and 25), kept between the interior of the bent rims and a ring of fiber, metal or other suitable material 91, supports a rubber ring 92 of suitable quality which, at the moment of introducing the disc on the axle of the bearing, will assume the position indicated in FIGURE 5.

For the storage of the powder, finally, the spindle 35 (FIGURE 19) traverses a cylinder 94, of soft elastic sponge fitted into the hole 93. For this purpose the cylinder 94 is axially perforated. This feature is not shown in FIGURE 5.

Care should also be taken that the hole 87 (FIGURE 22) through which passes the bundle of wires, should be closed with glue or the like making it completely impervious to the powder. The outside face of the glass disc 60 (FIGURES 11 and 27) has, marked with any system, two kinds of indications, one constituted by a certain number of concentric circumferences, in order to identify the tracings made by the stylus of the electro-magnets, and the other constituted by the polar coordinates for the tachometer. Between the two indication systems there is placed a scale for the subdivision.

A metallic cylinder casing 95 (FIGURE 5) closed by a glass disc 97 encloses the apparatus.

On the rim of the casing is placed a mask 96 (FIGURES 5 and 27) of metal or plastic, into which has been cut an opening of particular shape to show only the operating part of the glass disc 60. On the rims of the opening are marked the indications for the recording done by the electro-magnetic stylus, as well as the scale of values of the speed for the tachometer.

In the socket 88 which projects into the back of the recorder is introduced a corresponding plug with five pins to which lead the wires which are connected, for instance, with the stop lights, with the head lights, with the electro-magnets of the indicators etc.

When the automobile is moving, the stylus of the tachometer will draw a continuous line which represents the polar graph of the speed values as a function of the covered distance, while the electro-magnets, excited when organs controlled by said electro-magnets are used, leave a trace in the corresponding sector. In the case of the reverse gear, the drum revolves in the opposite direction. This fact does not damage the recorder, however, and it can be avoided by substituting for the spindle 54 another one with a transmission in one direction only.

The functioning of the recorder is also obtained if the rubber strips 69 and 99 are eliminated, naturally, together with the plates 67 and 23. In this case the height of the wing 68 has to be increased in such a way that its edges are very near to both the base of the drum and the glass disc.

In order to simplify the construction of the recorder, instead of rollers 48 and hollow cylinder 49, one can obviously avail oneself of the use of a normal anti-friction bearing existing in commerce, which will be keyed to the cylinder 47. In this case the disc 52 and the rubber ring will be eliminated.

In the two considered examples, in FIGURES 2 to 4 and 5 to 27 the powder holding wing, carrying or not the wiper, is shown in two distinct positions, in FIGURE 4 in almost vertical position, i.e. moved towards the right, for the purpose of having the benefit of a wider reading surface.

These two positions are not to be considered exclusive as the said wing can be also put in an intermediate position.

What I claim is:

1. Continuous recording of graphs, comprising, in combination, a hollow transparent cylinder, means to support said cylinder, means to rotate said cylinder around its axis, said cylinder containing in its inside a reserve of powder in contact with a part of the cylindrical transparent surface of said cylinder to which said powder adheres spontaneously to form a layer of said powder upon the inner cylindrical surface of said cylinder, recording means contacting the inner surface of said cylinder, means to operate said recording means to make a graph of a physical quantity, said recording means being in contact with the inner surface in that region thereof to which the powder adheres and out of the region containing said reserve of powder, said recording means making the graphs carrying off a layer of powder from that part of the inner cylindrical surface with which it is in contact, and finally cancelling periodically said graphs and thus bringing again said surface to its original condition.

2. Continuous recording of graphs according to claim 1, wherein said cancelling takes place when said surface, in its rotary motion, returns in contact with said reserve of powder.

3. Continuous recording graphs according to claim 1, wherein an elastic wiper is provided in contact with the inner cylindrical surface and means are provided to support said elastic wiper whereby said elastic wiper removes all the layer of powder showing the graph.

4. Continuous recording of graphs, according to claim 1, wherein the reserve of powder is formed by those metallic powders generally called "bronze powders."

5. Continuous recording of graphs, according to claim 1, wherein the reserve of powder is formed by "bronze powder" treated with stearic acid, so that the flakes forming the powder are provided with a film of said acid.

6. An instrument for recording graphs, comprising, in combination a hollow rotary drum having a transparent front wall with its axis horizontal, means to support said rotary drum, means to rotate said rotary drum, a reserve of powder inside said drum and in contact with said transparent front wall to which the powder spontaneously adheres, means to maintain said powder reserve in one of the lower quadrants of said drum in proper position to cover the recording range and yet permit the graphs to be observed, recording means contacting the inner transparent front wall in that region thereof to which the powder adheres and out of the region containing said reserve of powder, means to operate said recording means to make a graph of a physical quantity, said recording means making the graph by carrying off a layer of powder from said part of the front wall with which it is in contact and means for cancelling said graph when the transparent front wall returns, in its rotary motion, into contact with said powder reserve.

7. An instrument according to claim 6 including a radially extending fixed bottom wall, means to support said fixed bottom wall, said bottom wall being radially placed to maintain the powder reserve in the lower right quadrant of a counterclockwise revolving drum, said bottom wall being normal to the transparent front wall and shaped so that its edges are spaced from front, back and peripheral walls of the drum.

8. An instrument according to claim 7, in which the bottom wall is provided with an elastic strip fixed along the edge near the back wall of the revolving drum.

References Cited in the file of this patent

UNITED STATES PATENTS

| | | |
|---|---|---|
| 1,252,102 | Erdle | Jan. 1, 1918 |
| 1,681,460 | Bruhn | Aug. 21, 1928 |
| 2,002,891 | Hall | May 28, 1935 |
| 2,832,511 | Stockdale et al. | Apr. 29, 1958 |

FOREIGN PATENTS

| | | |
|---|---|---|
| 468,119 | Great Britain | June 29, 1937 |